July 3, 1956  H. J. OLSON  2,752,933
VALVE MECHANISM RESPONSIVE TO THE FLOW OF FLUID
Filed June 3, 1954

INVENTOR
Harold J. Olson
BY Harold E. Cole
Attorney

United States Patent Office 2,752,933
Patented July 3, 1956

2,752,933

VALVE MECHANISM RESPONSIVE TO THE FLOW OF FLUID

Harold J. Olson, Raynham, Mass.

Application June 3, 1954, Serial No. 434,138

10 Claims. (Cl. 137—87)

This invention relates to valve mechanism that is actuated by the flow of fluid.

One object of my invention is to provide mechanism that is actuated to open position by the flow of fluid, and automatically returns to closed position when said flow ceases.

Another object is to provide such valve mechanism which can be operatively connected to and between a motor and associated parts whereby a vacuum line between a vacuum diaphragm, and a motor manifold, for instance, will be automatically opened by the flow of a fluid to thus increase the speed of a motor that drives a fluid pump.

A further object is to provide such mechanism that is simple to manufacture and assemble, and likewise simple to make a working installation of.

The foregoing and other objects which will appear as the nature of the invention is better understood, may be accomplished by a construction, combination and operative arrangement of parts such as is disclosed by the drawings. The nature of the invention is such as to render it susceptible to various changes and modifications, and, therefore, I am not to be limited to the construction disclosed by the drawings nor to the particular parts described in the specification; but am entitled to all such changes therefrom as fall within the scope of my claims.

Figure 2:
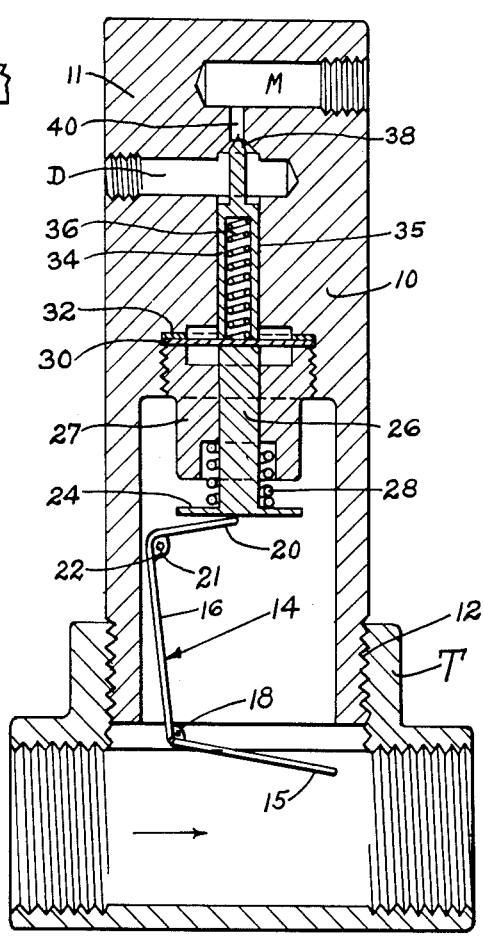
Figure 2 is a longitudinal, sectional view of my valve mechanism, shown in open position.

As illustrated, my mechanism has a supporting member shown as a housing 10 having a solid interior portion 11 at the upper part thereof. The housing is exteriorly screw-threaded as at 12, at its lower portion, whereby it can be connected to a tee fitting T forming part of passage P through which fluid may flow in the direction of the arrow shown in Figure 2, from a supply such as an oil tank truck.

Figure 1:
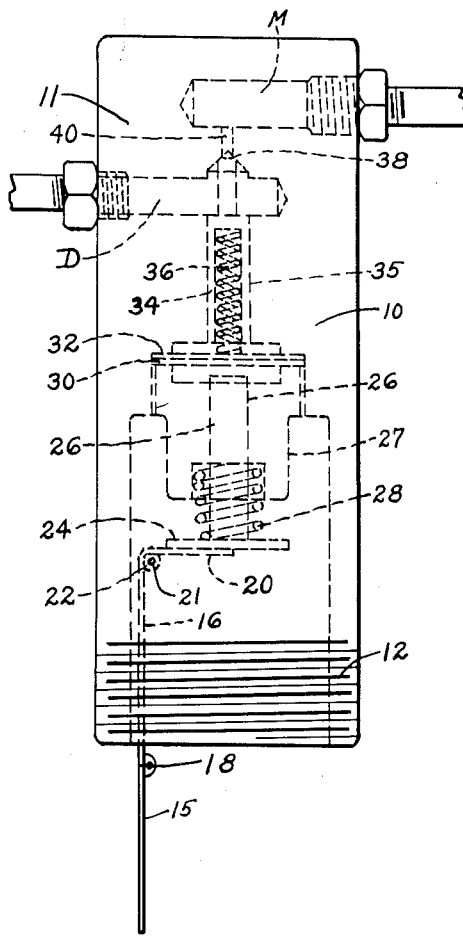
Figure 1 is a front elevational view of my valve mechanism, shown in closed position.

An actuating member 14 has an extension or flap 15 that extends below said housing 10 into said passage P and is in the path of fluid flowing therethrough. This actuating flap is pivotally connected by a spring hinge 18 to an arm 16 that movably extends from a point outside said housing 10 into the interior of the latter at one side thereof in a normaly vertical position, approximately parallel with the longitudinal axis of the housing as shown in Figure 1. Said spring hinge 18 is located just outside of said housing. A lifter portion 20, preferably integral with said arm 16 terminates said actuating member 14, and it is connected as at 21 to said housing 10 by means of a pin 22 mounted in said housing. Said lifter portion 20 normally lies at a right angle to said arm 16; but when the arm is actuated it moves to a diagonal position within said housing and raises the lower head 24 of a magnet 26, which normally contacts said lifter portion 20. Within said housing 10 is a screw-threaded guide bushing 27 that serves as part of the housing and remains in fixed position by screw-threaded engagement therein. It is spaced from said magnet head 24 and has an opening therein to movably receive said magnet.

A coil spring 28 bears on said magnet head 24 at one end and against said guide bushing 27 at the other end, and normally tends to hold said magnet 26 in the position shown in said Figure 1. A conductor member is shown as a metal disc 30 that is normally spaced from said magnet 26 and bears on an end of said bushing 27, preferably having a centrally apertured gasket 32 above it to make the mechanism tight at this point so no oil or other fluid will pass beyond.

Adjacent said metal disc 30 is a valve body 34 which slidably fits in a valve receiving opening 35 in said housing solid portion, being normally spaced from said disc 30. A coil spring 36 enters said valve body 34 and bears against the interior thereof at one end while the other end bears against said disc 30. At one end of said valve body 34 is a closure portion shown as a needle valve seat 38 which normally closes an opening in a valve receiving, intermediate conduit 40 within said housing solid portion 11. This conduit 40, as shown, communicates with an outer conduit D in said housing which may communicate with a well known vacuum diaphragm, not shown, in one installation, while it also communicates with another housing conduit M, that may communicate with a motor manifold in such an installation.

My mechanism may be used to automatically speed the pumping of oil from an automobile tank truck. For example, the pump is driven by the motor in the usual way. At the start the motor runs at idling speed and causes some oil to flow through the supply passage P, thus rotatably moving the actuating member 14 sufficiently for the lifter portion 20 to raise said magnet 26 upwardly towards the metal disc 30, which is thus activated. This draws the valve body 34 downwardly by magnetism towards said magnet head, compressing said spring 36, thus unseating said conical valve seat 38 which opens the conduit 40 within said housing 10, thereby establishing continuous communication through it and said conduits D and M. Said conduit D may be connected to a well known vacuum diaphragm having a control blade that commonly is connected to the carburetor throttle while the conduit M may connect with a motor manifold, for example. Upon establishing a vacuum through said conduits D and M, the vacuum diaphragm mechanism blade is actuated which opens said throttle to a predetermined position to thereby operate the oil pump at the most efficient pumping speed.

When the flow of fluid ceases said actuating member 14 returns to normal position, said coil spring 28 overcomes the force of said magnet to thereby return it to normal position shown in Figure 1. While the coil spring 36 is normally weaker than the magnetic force of said magnet, this latter spring, when the magnet is drawn away, automatically returns to normal position, thus moving said valve body 34 and said valve seat 38 to closed position in said intermediate conduit 40.

What I claim is:

1. Valve mechanism comprising a supporting member having an end opening therein, a valve receiving and a valve closure conduit, an actuating member pivotally attached to said supporting member embodying a flap portion extending below said supporting member, an arm extending into said supporting member end opening, means pivotally connecting said flap portion and arm, a lifter portion extending angularly from said arm, a magnet supported by said lifter portion extending into said end opening and slidable within said supporting member, a guide bushing fixed to and within said supporting member having an opening therein, said magnet movably extending into said bushing opening, a coil spring on said magnet bearing against an interior portion of said bushing and against an end portion of said magnet, a conductor member normally spaced from said magnet and in contact with said bushing, a valve body having an opening therein and being adjacent to and normally spaced from said conductor member and movably extending into said supporting member valve receiving opening and embodying a closure portion extending into said valve closure conduit in closed position, a coil spring supported by said conductor member at one end and extending into said valve body opening and bearing against said valve body at another end, said supporting member having two conduits in communication with opposite ends of said valve closure conduit and extending to the exterior portions of said supporting member, said coil springs being so positioned that upon actuation of said actuating member both are compressed.

2. Valve mechanism comprising a supporting member having an end opening therein, a magnet opening, a valve receiving opening and a valve closure conduit, an actuating member pivotally attached to said supporting member embodying a flap portion extending below said supporting member, an arm extending into said supporting member end opening, means pivotally connecting said flap portion and arm, a lifter portion extending angularly from said arm, a magnet supported by said lifter portion extending into and slidable within said supporting member magnet opening, said magnet movably extending into said magnet opening, a coil spring on said magnet bearing against an interior portion of said supporting member and against an end portion of said magnet, a conductor member normally spaced from said magnet and in contact with said supporting member, a valve body having an opening therein and being adjacent to and normally spaced from said conductor member and movably extending into said supporting member valve receiving opening and embodying a closure portion extending into said valve closure conduit in closed position, a coil spring supported by said conductor member at one end and extending into said valve body opening and bearing against said valve body at another end, said supporting member having two conduits in communication with opposite ends of said valve closure conduit and extending to the exterior portions of said supporting member, said coil springs being so positioned that upon actuation of said actuating member both are compressed.

3. Valve mechanism comprising a supporting member having an end opening therein, a magnet opening, a valve receiving opening, and a valve closure conduit, an actuating member pivotally attached to said supporting member embodying a flap portion extending below said supporting member, an arm extending into said supporting member end opening and normally being approximately parallel with said flap position, means pivotally connecting said flap portion and arm, a lifter portion within said end opening extending angularly from said arm, a magnet supported by said lifter portion extending into said end opening and slidable within said supporting member magnet opening, said magnet movably extending into said magnet opening, a coil spring on said magnet bearing against an interior portion of said supporting member and against an end portion of said magnet, a conductor member normally spaced from said magnet and in contact with said supporting member, a valve body having an opening therein and being adjacent to and normally spaced from said conductor member and movably extending into said supporting member valve receiving opening and embodying a closure portion extending into said valve closure conduit in closed position, a coil spring supported by said conductor member at one end and extending into said valve body opening and bearing against said valve body at another end, said supporting member having two conduits in communication with opposite ends of said valve closure conduit and extending to the exterior portions of said supporting member, said coil springs being so positioned that upon actuation of said actuating member both are compressed.

4. Valve mechanism comprising a supporting member having an end opening therein, a magnet opening, a valve receiving opening, and a valve closure conduit, an actuating member pivotally attached to said supporting member embodying a flap portion extending below said supporting member, an arm extending into said supporting member end opening, means pivotally connecting said flap portion and arm, a lifter portion extending angularly from said arm, a pin member pivotally connecting said actuating member to said supporting member adjacent said arm and lifter portion, a magnet supported by said lifter portion extending into said end opening and slidable with said supporting member magnet opening, said magnet movably extending into said magnet opening, a coil spring on said magnet bearing against an interior portion of said supporting member and against an end portion of said magnet, a conductor member normally spaced from said magnet and in contact with said supporting member, a valve body having an opening therein and being adjacent to and normally spaced from said conductor member and movably extending into said suporting member valve receiving opening and embodying a closure portion extending into said valve closure conduit in closed position, a coil spring supported by said conductor member at one end and extending into said valve body opening and bearing against said valve body at another end, said supporting member having two conduits in communication with opposite ends of said valve closure conduit and extending to the exterior portions of said supporting member, said coil springs being so positioned that upon actuation of said actuating member both are compressed.

5. Valve mechanism comprising a housing embodying a solid interior portion having a magnet opening, a valve receiving opening, and a valve closure conduit; an actuating member embodying a movable extension that is adapted to extend into a passage where a fluid flows, an arm extending into said housing, means movably connecting said extension to said arm, a lifter portion extending angularly from said arm, and means pivotally connecting said actuating member to said housing, a magnet slidable within said magnet opening one end of which is adjacent said lifter portion, a coil spring associated with said magnet bearing against an interior portion of said housing at one end and against said magnet at the other end, a conductor member normally spaced from said magnet within the interior of said housing, a valve body adjacent to and normally spaced from said conductor member and slidably extending into said valve receiving opening and embodying a closure portion normally extending into said valve closure conduit, a coil spring associated with said valve body within said housing interior in contact with and holding said valve body normally spaced from said conductor member, said housing solid interior having two conduits therein extending to the exterior thereof and in communication with said valve closure conduit, said coil springs being so positioned that upon actuation of said actuating member both are compressed.

6. Valve mechanism comprising a supporting member having an end opening therein, a magnet opening, a valve receiving opening and a valve closure conduit, an actuating member embodying an extension that is adapted to extend into a passage where a fluid flows, an arm extending into said end opening means movably connecting said extension to said arm, a lifter portion extending angularly from said arm, and means pivotally connecting said actuating member to said housing, a magnet slidable within said magnet opening one end of which normally contacts said lifter portion, a coil spring associated with said magnet bearing against an interior portion of said supporting member at one end and against said magnet at the other end, a conductor member normally spaced from said magnet within the interior of said supporting member, a valve body adjacent to and normally spaced from said conductor member and slidably extending into said valve receiving opening and embodying a closure portion normally extending into said valve closure conduit, a coil spring associated with said valve body within said supporting member interior in contact with and holding said valve body normally spaced from said conductor member, said supporting member having two conduits therein extending to the exterior thereof and in communication with said valve closure conduit, said coil springs being so positioned that upon actuation of said mechanism both are compressed.

7. Valve mechanism comprising a suppoting member having an end opening therein and a valve closure conduit, an actuating member extending into said opening and having an extension portion extending outside said supporting member and which, upon actuation, is adapted to actuate said actuating member, a magnet movably extending into said supporting member and movable with and supported by said actuating member, a conductor member within said supporting member, movable means to hold said magnet normally spaced from said conductor member, a valve body movably extending into said supporting member and normally spaced from said conductor member, said valve body embodying a closure portion normally extending into said valve closure conduit, other movable means normally spacing said valve body from said conductor member, said supporting member having two conduits therein extending to the exterior thereof and in communication with said valve closure conduit, both said means being so positioned that they automatically move to normal position when actuation of said actuating member ceases.

8. Valve mechanism comprising a supporting member having an end opening therein and a valve closure conduit, an actuating member extending into said opening and having an extension portion extending outside said supporting member and which, upon actuation, is adapted to actuate said actuating member, hinge means movably connecting said extension portion to an adjoining portion of said actuating member, a magnet movably extending into said supporting member and movable with and supported by said actuating member, a conductor member in fixed position within said supporting member, movable means to hold said magnet normally spaced from said conductor member, a valve body movably extending into said supporting member and normally spaced from said conductor member, said valve body embodying a closure portion normally extending into said valve closure conduit, other movable means normally spacing said valve body from said conductor member, said supporting member having two conduits therein extending to the exterior thereof and in communication with said valve closure conduit, both said means being so positioned that they automatically move to normal position when actuation of said actuating member ceases.

9. Valve mechanism comprising a supporting member having an end opening therein and a valve closure conduit spaced from said opening, an actuating member extending into said opening and having an extension portion extending outside said supporting member and which, upon actuation, is adapted to actuate said actuating member, a guide bushing within and attached to said supporting member having an opening therein, a magnet movably extending into said guide bushing opening and supported by said actuating member, a conductor member within said supporting member supported by said guide bushing, movable means to hold said magnet normally spaced from said conductor member, a valve body movably extending into said supporting member and normally spaced from said conductor member, said valve body embodying a closure portion normally extending into said valve closure conduit, other movable means normally spacing said valve body from said conductor member, said supporting member having two conduits therein extending to the exterior thereof and in communication with said valve closure conduit, both said means being so positioned that they automatically move to normal position when actuation of said actuating member ceases.

10. Valve mechanism comprising a supporting member having an end opening therein and a valve closure conduit, an actuating member extending into said opening embodying a flap portion extending beyond said supporting member, an arm extending into said end opening, hinge means connecting said arm to said flap portion, and a lifter portion fixed to and extending at approximately a right angle to said arm, said flap portion, upon actuation, being adapted to actuate said lifter portion, a magnet movably extending into said supporting member and movable with and supported by said actuating member, a conductor member within said supporting member, movable means to hold said magnet normally spaced from said conductor member, a valve body movably extending into said supporting member and normally spaced from said conductor member, said valve body embodying a closure portion normally extending into said valve closure conduit, other movable means normally spacing said valve body from said conductor member, said supporting member having two conduits therein extending to the exterior thereof and in communication with said valve closure conduit, both said means being so positioned that they automatically move to normal position when actuation of said actuating member ceases.

References Cited in the file of this patent
UNITED STATES PATENTS

| | | |
|---|---|---|
| 1,438,973 | Volgen | Dec. 19, 1922 |
| 2,564,894 | Glasgow | Aug. 21, 1951 |
| 2,687,739 | Shelburne et al. | Aug. 31, 1954 |